US008126475B2

(12) United States Patent
Kuchibhotla et al.

(10) Patent No.: US 8,126,475 B2
(45) Date of Patent: Feb. 28, 2012

(54) APPARATUS AND METHOD FOR UPLINK SCHEDULING ON SHARED CHANNELS

(75) Inventors: Ravi Kuchibhotla, Gurnee, IL (US); Padmaja Putcha, Gurnee, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 799 days.

(21) Appl. No.: 11/539,873

(22) Filed: Oct. 9, 2006

(65) Prior Publication Data
US 2008/0085719 A1 Apr. 10, 2008

(51) Int. Cl.
*H04W 72/00* (2009.01)
(52) U.S. Cl. ............... 455/452.2; 455/450; 455/451; 455/452.1; 455/453; 370/395.42
(58) Field of Classification Search .......... 455/450, 455/451, 452.2, 453; 370/395.2, 395.21, 370/395.3, 395.31, 395.32, 395.4, 395.41, 370/395.42, 395.43
See application file for complete search history.

(56) References Cited

U.S. PATENT DOCUMENTS

| | | | | |
|---|---|---|---|---|
| 5,539,729 | A * | 7/1996 | Bodnar ........................ | 370/232 |
| 6,421,335 | B1 * | 7/2002 | Kilkki et al. .................. | 370/342 |
| 6,597,682 | B1 * | 7/2003 | Kari ............................ | 370/348 |
| 7,464,180 | B1 * | 12/2008 | Jacobs et al. ................. | 709/240 |
| 7,496,067 | B2 * | 2/2009 | Qiu et al. ...................... | 370/329 |
| 2002/0024936 | A1 * | 2/2002 | Yamamoto .................... | 370/252 |
| 2002/0035642 | A1 * | 3/2002 | Clarke et al. .................. | 709/244 |
| 2002/0141454 | A1 * | 10/2002 | Muniere ........................ | 370/535 |
| 2003/0031201 | A1 | 2/2003 | Choi | |
| 2005/0047405 | A1 * | 3/2005 | Denzel et al. ................. | 370/388 |
| 2006/0092869 | A1 * | 5/2006 | Herrmann ..................... | 370/314 |
| 2006/0105796 | A1 * | 5/2006 | Malladi et al. ................ | 455/522 |
| 2006/0114821 | A1 * | 6/2006 | Willey et al. .................. | 370/229 |
| 2006/0126559 | A1 * | 6/2006 | Jun et al. ...................... | 370/329 |
| 2007/0054686 | A1 * | 3/2007 | Allen et al. ................... | 455/518 |
| 2008/0049772 | A1 * | 2/2008 | Faniuolo et al. .............. | 370/412 |
| 2008/0062881 | A1 * | 3/2008 | Martin et al. ................. | 370/238 |

FOREIGN PATENT DOCUMENTS

| | | |
|---|---|---|
| EP | 1315342 A1 | 5/2003 |
| EP | 1545040 A1 | 6/2005 |
| EP | 1643690 A1 | 4/2006 |
| EP | 1681887 A1 | 7/2006 |
| WO | 2005/125252 A1 | 12/2005 |
| WO | 2006/071155 A1 | 7/2006 |
| WO | WO 2006/089568 * | 8/2006 |

OTHER PUBLICATIONS

International Search Report and Written Opinion; International Application No. PCT/US2007/078398; dated Jan. 15, 2008. 3rd Generation Partnership Project; Technical Specification Group Radio Access Network; FDD Enhanced Uplink; Overall description; Stage 2 (Release 6); 3GPP TS 25.309; V6.6.0; Mar. 2006.

* cited by examiner

*Primary Examiner* — Rafael Pérez-Gutiérrez
*Assistant Examiner* — German Viana Di Prisco

(57) ABSTRACT

A network controller or base station (502), allocates resources and indicates a minimum priority level below which, mobile stations may not transmit data via messaging (503). Messaging (503) may be a scheduling message in some embodiments. The network controller or base station (502) also communicates a data timer setting for timing sub-minimum priority data via messaging (505). Messaging (505) may be a control message in some embodiments. The mobile station (501) responds by setting a data timer (507) and holding data with a priority below the specified minimum. Before the timer times out, the mobile station (501) may transmit data on granted resources via (509) provided its priority level is above the specified minimum. After timer expiration, the mobile station (501) may transmit its low priority data, or combinations of high and low priority data (511).

15 Claims, 5 Drawing Sheets

APPARATUS AND METHOD FOR UPLINK SCHEDULING ON SHARED CHANNELS

FIELD OF THE DISCLOSURE

The present disclosure relates generally to quality of service on a communications channel and more particularly to methods and apparatuses for scheduling uplink data transmissions to maintain quality of service requirements.

BACKGROUND

Wireless communications systems, for example packet data communications systems, may utilize shared channels wherein the network allocates resources to a mobile station for uplink transmissions based on the number of mobiles requesting resources, the channel conditions of the mobile station, and the services for which the mobile station is requesting resources.

The mobile station will transmit information to the network regarding a buffer status of each radio bearer or for a group of radio bearers. Typically each service utilized by the mobile station is mapped to one radio bearer. Each service and thus, each radio bearer, is associated with a priority. In order to minimize the amount of signaling overhead, it is preferred to have a mobile station indicate the amount of data in its buffer across all radio bearers and indicate for example, the highest priority radio bearer that has data waiting to be sent. This allows the network to assign resources with some degree of fairness.

However, since the network does not have the absolute latest information regarding each and every radio bearer it typically will assign resources to a mobile station that may be used to transmit data from a number of radio bearers. One issue with such a mechanism is that the network is not in control of the exact usage of resources by the mobile station.

For example, the mobile station may have data in the buffer for radio bearer (RB) #1, 2, 3 and 4, wherein the sequence number also indicates a priority of the data. For example, RB #4 may indicate the lowest priority data while RB#1 may indicate the highest priority data.

However, if another mobile station has data buffered that is in a higher priority queue, the network should not allow a mobile station to send data from RB#4 because of its very low data priority. Instead it would be preferable for the network to allocate resources to the mobile station with the highest priority data.

On the other hand, preventing mobile stations from transmitting low priority data when high priority data is buffered by other mobile stations may result in a "starvation" effect wherein the low priority data may be queued indefinitely or otherwise for an inordinate amount of time.

The $3^{rd}$ Generation Partnership Project Technical Standard, 3GPP TS 25.309, describes procedures adopted for a shared uplink channel, Enhanced Dedicated Channel (E-DCH) for UMTS networks. Per the standard, a mobile station may send the identity of the highest priority logical channel with data in buffer and the total amount of data in its buffer across all the radio bearers. Because the uplink is designed as a synchronous Hybrid Automatic Repeat Request (HARQ) channel, the mobile station may then choose data from all of its radio bearers as long as it does not exceed the resources assigned.

In the enhanced uplink the mobile sends a "happy bit" when the time required to transmit data in radio bearers mapped to scheduled transmissions, as opposed to non-scheduled transmissions, exceeds a Happy bit delay condition. This procedure is applied for all radio bearers utilizing scheduled grants. Unfortunately, there is no ability to discriminate between radio bearers with different priorities.

Thus, there is a need for apparatuses and methods for restricting a mobile station usage of resource grants for transmission of data while avoiding starvation of low priority data.

DETAILED DESCRIPTION

In the various embodiments, a network, at the time resources are granted, indicates the lowest priority service, or lowest priority radio bearer for which a mobile may send data. Thus, a fairness policy is enforced and a mobile station is prevented from transmitting data from a very low priority radio bearer, unless explicitly permitted by the network.

Further in the various embodiments, the network avoids starvation of low priority data, that is, low priority data buffered by a mobile station and in queue. In such embodiments, the network may configure the mobile station with a timer. The timer offsets the data priority minimum indication provided by the network in a grant. If the timer expires the mobile station may override the priority floor indication and transmit data from a low priority buffer.

In some alternate embodiments, the mobile station may, upon expiration of the timer, provide an indication to the network that it has pending data buffered for transmission. Unlike the "happy bit" indicator specified in the standards for an E-DCH, the various embodiments basis for mobile station indications is triggered by, and otherwise based upon, network configuration.

The mobile station may start the timer when the first Protocol Data Unit (PDU) arrives in the buffer for the low priority service, or low priority radio bearer, or group of radio bearers. The timer may be reset when either; at least one PDU or some minimum number of PDUs, based upon for example a desired data rate, have been transmitted by the mobile from the queue.

Thus, in the various embodiments, by explicitly indicating a priority floor for which the grant is to be used the network ensures that a mobile station will not send data from a buffer with very low priority, particularly when other mobile stations are waiting to transmit higher priority data. This is especially important in the case of synchronous transmissions, because a mobile station in this case is allowed to retransmit a certain number of times which results in undesired traffic loading on the uplink. By employing the timing function of the various embodiments, set by the network, a mobile station may avoid starvation of low priority data, that is, waiting indefinitely or otherwise waiting an inordinate time period before low priority data may be transmitted.

Figure 1:
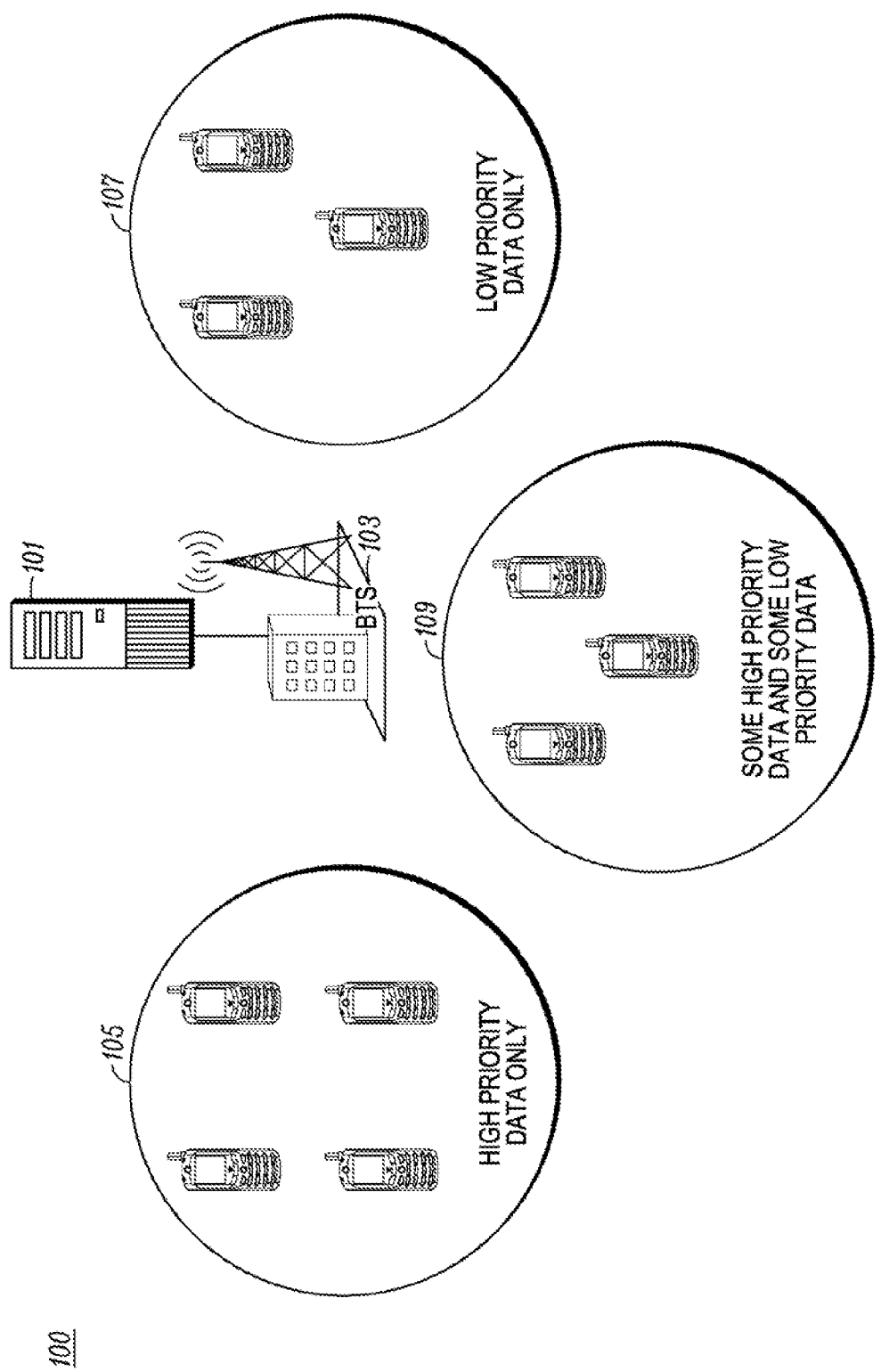
FIG. 1 is a block diagram of a wireless packet communication network wherein mobile stations may buffer data of various priorities.

Turning now to the drawings wherein like numerals represent like components, FIG. 1 illustrates a communications network 100, having various base stations such as base station 103, and wherein each base station has a corresponding coverage area. In general, base station coverage areas may overlap and, in general, form an overall network coverage area. The base stations may be referred to by other names such as base transceiver station (BTS), "Node B", and access node (AN), depending on the technology. A network coverage area may comprise a number of base station coverage areas, which may form a contiguous radio coverage area. However, it is not required to have contiguous radio coverage and therefore a network coverage area may alternatively be distributed.

Furthermore, each coverage area may serve a number of mobile stations. Mobile stations may also be referred to as access terminals (ATs), user equipment (UEs), or other terminology depending on the technology. A number of bases stations 103 will be connected to a base station controller 101 via backhaul connections. The base station controller 101 and base stations form a Radio Access Network (RAN). The overall network may comprise any number of base station controllers, each controlling a number of base stations. Note that the base station controller 101 may alternatively be implemented as a distributed function among the base stations 103. Regardless of specific implementations, the base station controller 101 comprises various modules for packetized communications such as a packet scheduler, packet segmentation and reassembly, etc., and modules for assigning appropriate radio resources to the various mobile stations.

The base stations 103 may communicate with the mobile stations via any number of standard air interfaces and using any number of modulation and coding schemes. For example, Universal Mobile Telecommunications System (UMTS), Evolved UMTS (E-UMTS) Terrestrial Radio Access (E-UTRA) or CDMA2000 may be employed. Further, E-UMTS may employ Orthogonal Frequency Division Multiplexing (OFDM) and CDMA2000 may employ orthogonal spreading codes such as the Walsh codes. Semi-orthogonal spreading codes may also be utilized to achieve additional channelization over the air interface. Further the network may be an Evolved High Rate Packet Data (E-HRPD) network. Any appropriate radio interface may be employed by the various embodiments.

In some embodiments, mobile stations may be grouped and for each mobile station group, a scheduling function of the base station controller 101, or base station 103, may assign a set of time-frequency resources to be shared by the mobile stations in the group. An indication of the set of shared resources and an ordering pattern may be signaled from the base station 103 to the mobile stations using a control channel. Further, the control channel may be transmitted in any frame with a pre-defined relationship with the beginning frame of the set of shared resources. The set of shared resources may begin in the same frame the control channel is transmitted, may have a fixed starting point relative to the frame that the control channel is transmitted, or may be explicitly signaled in the control channel. In any case, the various embodiments will employ a grant message for allocating resources to a mobile station and a scheduling message indicating a minimum data priority.

In the various embodiments, mobile stations will utilize radio bearers to transmit protocol data units (PDUs) wherein the radio bearers may be mapped to a set of predetermined services. Mobile stations may thus be utilizing multiple services simultaneously and may therefore buffer data for transmission wherein the data has various priorities. Thus some mobile stations 105 may have only high priority data buffered and waiting to be transmitted, whereas other mobile stations 107 may only have low priority data waiting for transmission. Additionally, some mobile stations 109 may have a mix of high a low priority data.

Figure 2:
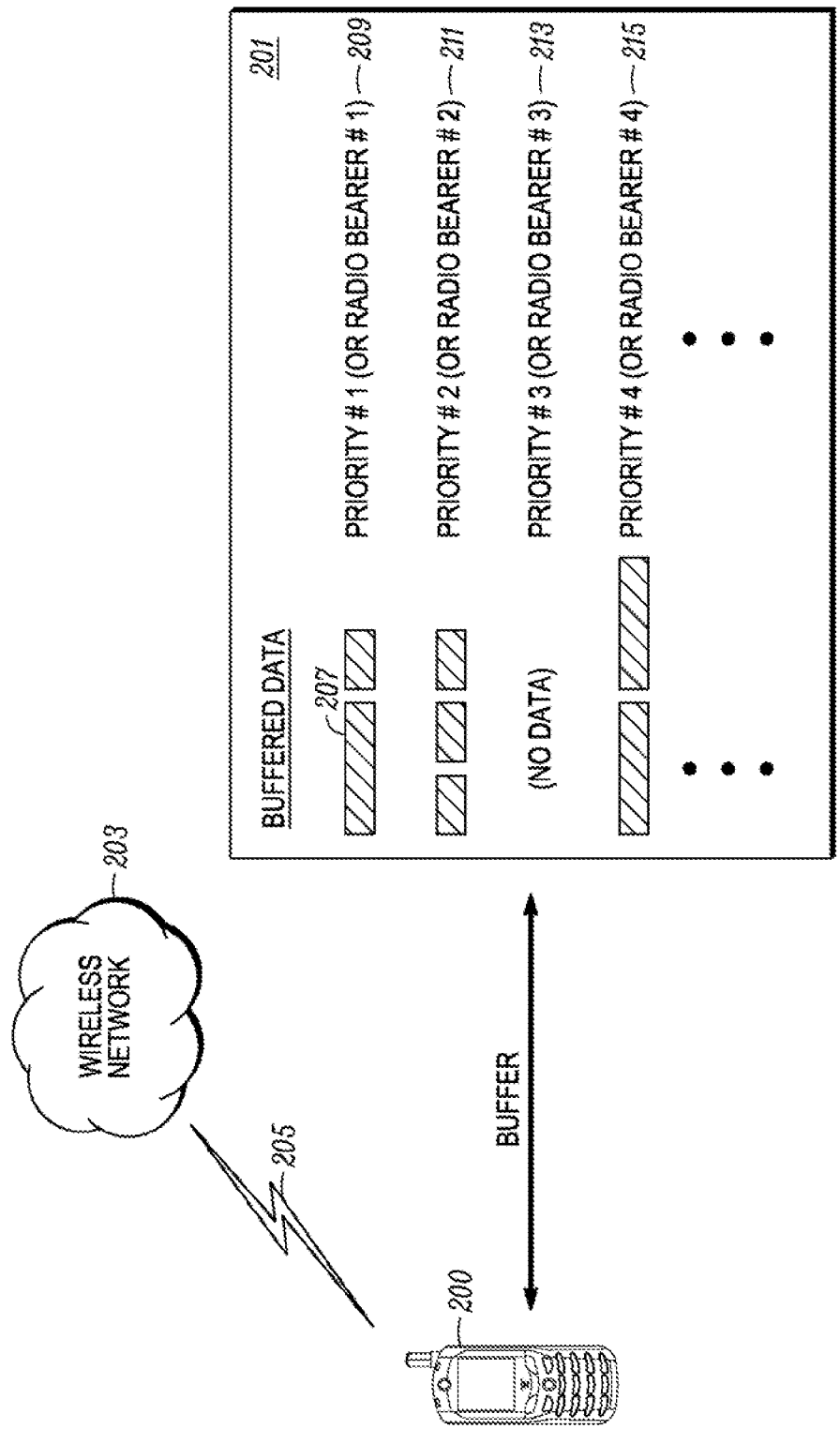
FIG. 2 is block diagram of a mobile station transmission buffer wherein data of various priorities is buffered and/or queued.

FIG. 2 illustrates a mobile station 200, which communicates with a wireless network 203 via a wireless interface 205 which may include a dedicated channel or enhanced dedicated channel in some embodiments. The mobile station 200 has a memory comprising buffered data 201, which further comprises sets of PDUs 207 associated with various services and/or radio bearers. As discussed above, specific services may be mapped to specific radio bearers in the various embodiments.

In the example of FIG. 2, a mobile station having a mix of high and low priority data, such as mobile stations 109 in FIG. 1 is illustrated. In FIG. 2, a first set of PDUs is shown buffered having a first or high priority and corresponding to a first radio bearer, that is, priority #1 data mapped to radio bearer #1 209. Similarly, a second set of PDUs is shown buffered having a second level priority and corresponding to a second radio bearer, that is, priority #2 data mapped to radio bearer #2 211.

In the FIG. 2 example, no level 3 data is buffered and thus no priority #3 data, which is mapped to radio bearer #3 213, is stored. Also in FIG. 2, data is buffered for priority #4 mapped to radio bearer #4 215. It is thus to be understood that data may be stored having any mix of priorities wherein any specific priority may be mapped to a specific radio bearer as exemplified by FIG. 2. Given a granted set of resources, the mobile station 200 would proceed to transmit its highest priority data 209, proceed to its lower priority data 211, and finally transmit its lowest priority data 215.

Returning briefly to FIG. 1, if the set of mobile stations having only low priority data, that is mobile stations 107, are granted resources, the mobile stations would proceed to transmit low priority data which utilizes resources needed by the higher priority mobile stations, that is, the mobile stations 105 having high priority data queued.

Figure 3:
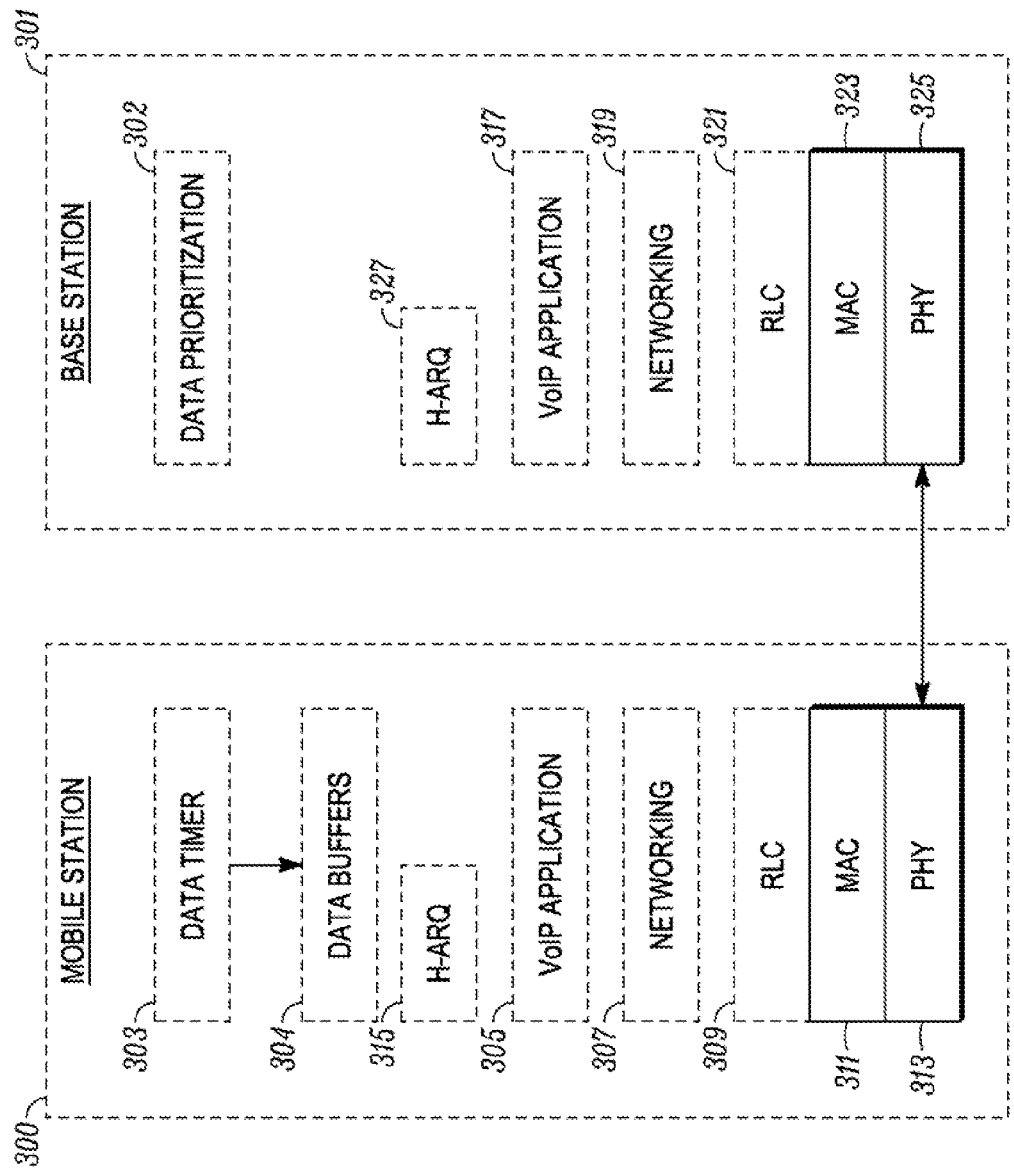
FIG. 3 is diagram showing a mobile station and base station architecture in accordance with various embodiments.

Turning now to FIG. 3, a mobile station 300 and base station 301 architectures in accordance with the various embodiments are illustrated. Mobile station 300 comprises a stack having a VoIP application 305, a networking layer 307, a Radio Link Controller (RLC) 309, a Medium Access Controller (MAC) 311, and a Physical Layer (PHY) 313. In addition, mobile station 300 has HARQ component 315, which may be separate or may be integrated into any of the other components/layers. The mobile station 301 HARQ component 315 may receive messages for determining resource allocations for transmitting or receiving data. The mobile station may transmit and receive various messages to and from the base station on the physical layer 313.

In accordance with the embodiments, mobile station 300 has a data buffer or data buffers 304 for storing data associated with a service, radio bearer and/or priority. Further, mobile station 300 has a data timer 303, the time being determined by the network and sent to mobile station 300 in a control message in some embodiments. The data timer 303 is used to determine a length of time that low priority data, specifically in some embodiments, data below a predetermined priority minimum, is stored in data buffers 304. If the low priority data is stored longer than the data timer 303, then the low priority data may be transmitted by mobile station 300 on granted resources.

The base station 301, similar to mobile station 300, has a VoIP application 317, a networking layer 319, a RLC 321, MAC 323 and PHY 325. However, base station 301 additionally may have in some embodiments a HARQ scheduling component 327. The base station 301 HARQ scheduling component 327 may send various messages to mobile stations for indicating their resource allocations for transmitting or receiving data. Further, the HARQ scheduling component 327 may define HARQ subgroups in some embodiments.

The base station of some embodiments also comprises data prioritization module 302. The data prioritization module 302 may be a separate module as shown, or may be integrated into various other modules such as HARQ scheduling component 327. Further, the modules shown in FIG. 3 may be distributed between a base station and network controller, such as the network controller 101 and base station 103 illustrated in FIG. 1.

Returning to FIG. 3, data prioritization module 302 determines a minimum data priority level for which mobile stations may transmit data over granted resources. The minimum priority level is dynamic and may be determined by various network conditions such as throughput, delay, etc., and may in some embodiments be communicated to the mobile stations via a scheduling message.

The data prioritization module 302, in accordance with some embodiments, may further determine a time in which low priority data may not be transmitted, but after which, low priority data may be transmitted, by a mobile station, or in some circumstances, a group of mobile stations. The timing information may also be dynamic based upon network conditions as discussed above with respect to the priority minimum. The timing information may be communicated to the mobile stations via a control message.

Figure 4:
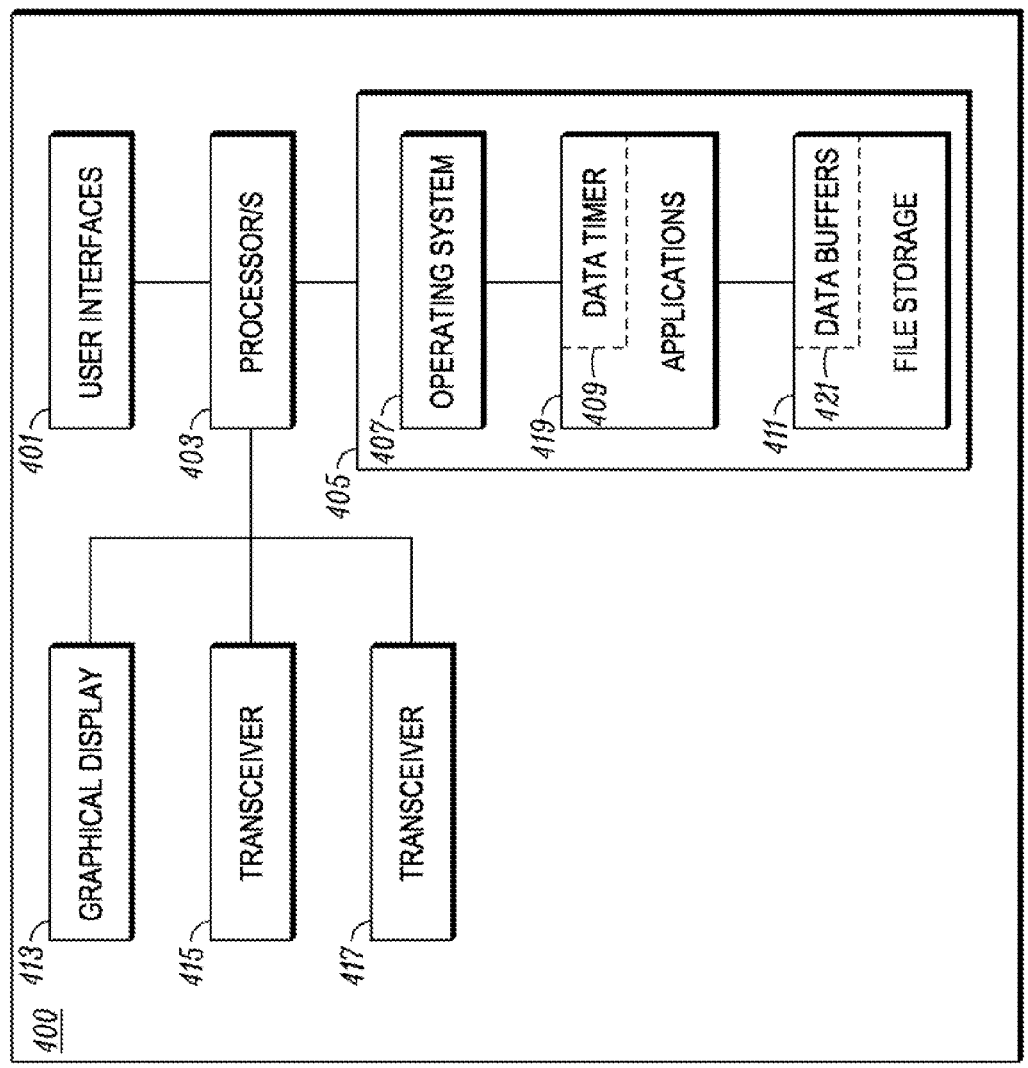
FIG. 4 is block diagram of a mobile station in accordance with various embodiments.

FIG. 4 is a block diagram illustrating the primary components of a mobile station in accordance with some embodiments. Mobile station 400 comprises user interfaces 401, at least one processor 403, and at least one memory 405. Memory 405 has storage sufficient for the mobile station operating system 407, applications 409 and general file storage 411. Mobile station 400 user interfaces 401, may be a combination of user interfaces including but not limited to a keypad, touch screen, voice activated command input, and gyroscopic cursor controls. Mobile station 400 has a graphical display 413, which may also have a dedicated processor and/or memory, drivers etc. which are not shown in FIG. 4.

It is to be understood that FIG. 4 is for illustrative purposes only and is for illustrating the main components of a mobile station in accordance with the present disclosure, and is not intended to be a complete schematic diagram of the various components and connections therebetween required for a mobile station. Therefore, a mobile station may comprise various other components not shown in FIG. 4 and still be within the scope of the present disclosure.

Returning to FIG. 4, the mobile station 400 may also comprise a number of transceivers such as transceivers 415 and 417. Transceivers 415 and 417 may be for communicating with various wireless networks using various standards such as, but not limited to, UMTS, E-UMTS, E-HRPD, CDMA2000, 802.11, 802.16, etc.

Memory 405 is for illustrative purposes only and may be configured in a variety of ways and still remain within the scope of the present disclosure. For example, memory 405 may be comprised of several elements each coupled to the processor 403. Further, separate processors and memory elements may be dedicated to specific tasks such as rendering graphical images upon a graphical display. In any case, the memory 405 will have at least the functions of providing storage for an operating system 407, applications 409 and general file storage 411 for mobile station 400. In some embodiments, and as shown in FIG. 3, applications 409 may comprise a software stack that communicates with a stack in the base station. In the various embodiments, file storage 411 may comprise the data buffers 421 for storing data of various priority levels prior to transmission.

Also in the various embodiments, applications 419 may include a data timer 409 for determining when low priority data stored in data buffers 421 may be transmitted over granted resources.

Figure 5:
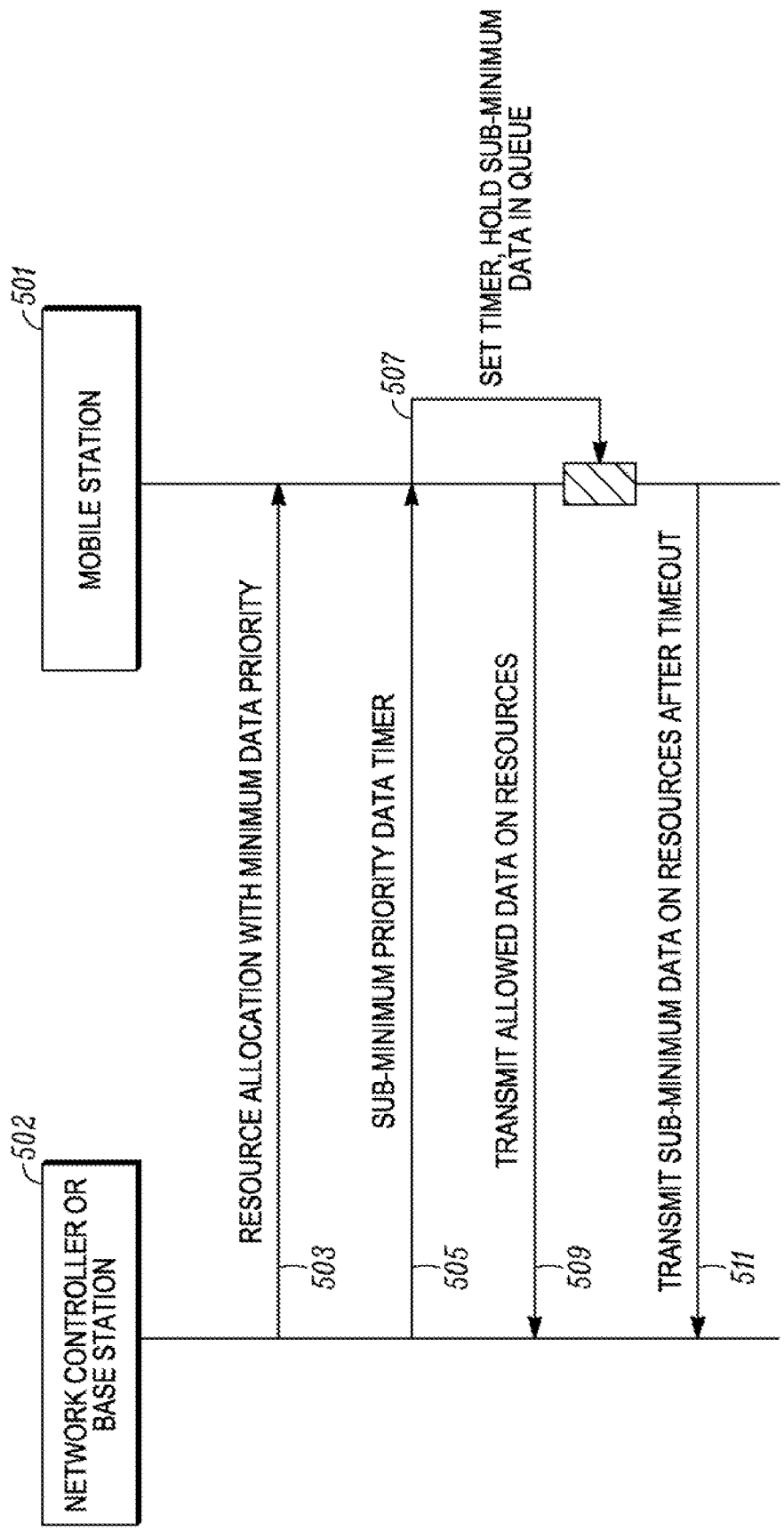
FIG. 5 is a message flow diagram illustrating basic operation of a network controller or base station, and a mobile station, in accordance with the various embodiments.

FIG. 5 summarizes operation of a network controller or base station, and a mobile station in accordance with the various embodiments. The network controller or base station 502, allocates resources and indicates a minimum priority level below which, the mobile stations should not transmit data via messaging 503. Messaging 503 may be a scheduling message in some embodiments.

The network controller or base station 502 also communicates a data timer setting for timing sub-minimum priority data via messaging 505. Messaging 505 may be a control message in some embodiments. The mobile station 501 responds by setting a data timer 507 and holding data with a priority below the specified minimum. Before the timer times out, the mobile station 501 may transmit data on granted resources via 509 provided its priority level is above the specified minimum.

After expiration of the timer, the mobile station 501 may transmit its low priority data, or combinations of high and low priority data via transmission 511.

The mobile station may either transmit low priority data until its buffered data is exhausted or in some embodiments may transmit only a percentage of the data is transmitted. In such embodiments, the network may also specify the data percentage to be transmitted after expiration of the timer. The percentage may be communicated to the mobile stations via messaging 505 which may be a control message as discussed above.

The timer function may be dynamically updated during a subsequent message 505. Likewise the data priority may be raised or lowered in subsequent scheduling messages 503. Alternatively, in some embodiments, the mobile station will reset the timer after the low priority data transmission percentage, which was also specified in messaging 505, was satisfied.

While various embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of operating a network infrastructure entity, the method comprising:

mapping a set of data priorities to a set of radio bearers, each of said radio bearers of said set of radio bearers corresponding to a data priority of said set of data priorities;

setting a minimum data priority below which low priority data having a priority below said minimum data priority should not be transmitted over any of said radio bearers, wherein said data is associated with a service;

sending said minimum data priority to a mobile station along with a resource allocation, wherein prioritized data having a priority equal to or above said minimum data priority is allowed to be transmitted by said mobile station using said resource allocation;

setting, by said network infrastructure entity, a time limit for which said mobile station may buffer said low priority data, wherein said mobile station may transmit said low priority data using said resource allocation after said time limit expires; and sending said time limit from said network infrastructure entity to said mobile station.

2. The method of claim 1, wherein sending said time limit to said mobile station further comprises:
sending said time limit to said mobile station in a control message.

3. The method of claim 1, wherein sending said minimum data priority to a mobile station along with a resource allocation further comprises sending a scheduling message.

4. The method of claim 1, wherein said time limit set by said network infrastructure entity is dynamically determined based upon network conditions.

5. A method in a mobile station, the method comprising:
buffering a first set of data having a first priority and a second set of data having a second priority lower than said first priority;
receiving a resource allocation for transmitting said first set of data and said second set of data;
receiving a priority minimum below which data should not be transmitted;
receiving, from a base station, a time setting for which data having a priority below said priority minimum should not be transmitted and setting a timer according to said time setting;
determining whether said second set of data has a priority above or below said priority minimum;
receiving a data percentage indicating an allowable data percentage of buffered said priority minimum data, that is allowed to be transmitted;
transmitting said second set of data using said resource allocation if said second priority is equal to or above said priority minimum; and
holding said second set of data if said second priority is below said priority minimum, transmitting said allowable data percentage of said second set of data after said timer expires, and continuing to buffer data having a priority below said priority minimum.

6. The method of claim 5, wherein receiving a priority minimum below which data should not be transmitted, further comprises receiving a scheduling message having said priority minimum.

7. The method of claim 5, wherein receiving a time setting for which data having a priority below said priority minimum should not be transmitted, further comprises receiving a control message having said time setting.

8. A mobile station comprising:
at least one transceiver;
at least one processor coupled to said transceiver; said transceiver and said processor configured to:
buffer a first set of data having a first priority and a second set of data having a second priority lower than said first priority;
receive a resource allocation for transmitting said first set of data and said second set of data;
receive a priority minimum below which data should not be transmitted;
receive, from a base station, a time setting for which data having a priority below said priority minimum should not be transmitted and set a timer according to said time setting;
determine whether said second set of data has a priority above or below said priority minimum;
receive a data percentage indicating an allowable percentage of data stored by said buffer, said data having a priority lower than said priority minimum, that is allowed for transmission;
transmit said second set of data using said resource allocation if said second priority is equal to or above said priority minimum; and
hold said second set of data if said second priority is below said priority minimum, transmit said allowable data percentage of said second set of data after said timer expires, and continue to buffer data having a priority below said priority minimum.

9. The mobile station of claim 8, wherein said transceiver and said processor are further configured to receive said priority minimum below which data should not be transmitted, by receiving a scheduling message having said priority minimum.

10. The mobile station of claim 8, wherein said transceiver and said processor are further configured to receive said time setting for which data having a priority below said priority minimum should not be transmitted, by receiving a control message having said time setting.

11. A base station comprising:
a transceiver;
a processor coupled to said transceiver, said transceiver and said processor configured to:
map a set of data priorities to a set of radio bearers, each of said radio bearers of said set of radio bearers corresponding to a data priority of said set of data priorities, said set of radio bearers further corresponding to said resource allocation;
set a minimum data priority below which low priority data having a priority below said minimum data priority should not be transmitted over any of said radio bearers, wherein said data is associated with a service;
send said minimum data priority to a mobile station along with a resource allocation, wherein prioritized data having a priority equal to or above said minimum data priority is allowed to be transmitted by said mobile station using said resource allocation;
setting a time limit for which said mobile station may buffer said low priority data, wherein said mobile station may transmit said low priority data using said resource allocation after said time limit expires; and
sending said time limit to said mobile station.

12. The base station of claim 11, wherein said transceiver and said processor are further configured to:
send said time limit to said mobile station in a control message.

13. The base station of claim 12, wherein said transceiver and said processor are further configured to send a data percentage indicating a percentage of data stored by said buffer, said data having a priority lower than said priority minimum, for transmission after said timer expires.

14. The base station of claim 12, wherein said data is a plurality of protocol data units.

15. The base station of claim 11, wherein said transceiver and said processor are further configured to send said minimum data priority to said mobile station along with a resource allocation by sending a scheduling message.

* * * * *